United States Patent
Slack et al.

(10) Patent No.: US 7,348,523 B2
(45) Date of Patent: Mar. 25, 2008

(54) METHOD OF INDUCTION WELD FORMING WITH SHEAR DISPLACEMENT STEP

(75) Inventors: Maurice William Slack, Edmonton (CA); Daniel Mark Shute, Beaumont (CA)

(73) Assignee: Noetic Engineering Inc., Edmonton (CA)

( * ) Notice: Subject to any disclaimer, the term of this patent is extended or adjusted under 35 U.S.C. 154(b) by 281 days.

(21) Appl. No.: 10/558,881

(22) PCT Filed: Jun. 7, 2004

(86) PCT No.: PCT/CA2004/000842

§ 371 (c)(1),
(2), (4) Date: Dec. 1, 2005

(87) PCT Pub. No.: WO2004/108341

PCT Pub. Date: Dec. 16, 2004

(65) Prior Publication Data

US 2006/0289480 A1    Dec. 28, 2006

(30) Foreign Application Priority Data

Jun. 10, 2003    (CA)    .................................... 2431632

(51) Int. Cl.
*H05B 6/10*    (2006.01)
*B23K 13/02*    (2006.01)

(52) U.S. Cl. ...................... 219/617; 219/603; 219/659; 219/61.2; 219/101; 228/115

(58) Field of Classification Search ........ 219/603–617, 219/61.2, 61.5, 659, 101, 110; 228/115–116, 228/103, 105
See application file for complete search history.

(56) References Cited

U.S. PATENT DOCUMENTS

| | | | | |
|---|---|---|---|---|
| 4,669,650 A | * | 6/1987 | Moe ............................ | 228/219 |
| 5,403,986 A | * | 4/1995 | Goleby ...................... | 219/61.2 |
| 5,571,437 A | * | 11/1996 | Rudd .......................... | 219/607 |
| 2005/0092715 A1 | * | 5/2005 | Alford et al. ............... | 219/61.2 |

* cited by examiner

Primary Examiner—Philip H. Leung
(74) Attorney, Agent, or Firm—Donald V. Tomkins

(57) ABSTRACT

A shear-assisted solid state welding method for joining of metal parts, involves a first step of heating opposing surfaces in a non-passivating environment to a temperature in the hot working temperature range of the metal. A second step involves bringing the opposing surfaces into contact while still in the hot working temperature range, and applying compressive stress sufficient to substantially prevent sliding in response to shear displacement, causing plastic flow in the hot layers. A third step involves imposing relative shear displacement of the metal work pieces without disengaging the opposing surfaces. The shear displacement induces plastic shear strain within the hot layers to progressively induce bonding.

25 Claims, 12 Drawing Sheets

METHOD OF INDUCTION WELD FORMING WITH SHEAR DISPLACEMENT STEP

FIELD OF THE INVENTION

The present invention relates to methods of making metal weldments. In particular, the invention relates to a method of rapidly joining metal work pieces having locally heated mating surfaces brought into contact in a non-oxidizing or non-passivating environment by inducing a bond through introduction of shear strain into the material adjacent to the contact interface.

BACKGROUND OF THE INVENTION

The task of joining or connecting segments of pipe dominates the construction of wells and pipelines used to produce petroleum and other reservoir fluids. The cost of manufacture and quality control, and the technical attributes of the joins or connections created, provide an ever present motivation for both more efficient and versatile connections. Environmental requirements have served to heighten these demands as most of these are linear systems with little or no redundancy to mitigate the consequence of even a single connection failure.

For such tubulars, the joining methods most commonly employed are arc-welding for pipelines and threaded connections for casing or well bore completion. Both of these are 'single point' manufacturing processes. In arc-welding, electrode material is incrementally deposited and threaded connections are formed by the incremental removal of material during machining. Such single point processes tend to demand more detailed inspection and require greater manufacturing time than 'global' joining processes, such as friction welding. Furthermore, recent developments in the use of expandable tubulars to complete wellbores have placed demands on the casing more readily met by welded, rather than threaded connections.

These and other long felt industry needs have thus motivated the present inventors, to pursue discovery of ever more reliable, high quality and rapid weldments.

Similar purposes have motivated the development of other welding methods such as the "Method for Interconnecting Tubulars by Forge Welding" disclosed by Alford et al. in WO 03/055635 A1 and the related "Method for Joining Tubular Parts of Metal by Forge/Diffusion Welding" disclosed by Moe in U.S. Pat. No. 4,669,650. These methods seek to extend solid state forge and diffusion welding principles to achieve metallurgical bonding with less flash (i.e., extruded material) than typically required to forge weld and in less time than typically required to diffusion weld by the introduction of a reducing flushing fluid. The flushing fluid comprises a reducing gas such as hydrogen or carbon monoxide, perhaps mixed with a non-reactive gas such as nitrogen, and is used to blanket the mating ends of work pieces which are locally heated then pressed together to form a forge weld. The reducing gas, in combination with other means (e.g., low water vapour concentration) is understood to minimize the presence of oxides that would otherwise impede the rate and quality of bond formation. These methods, while apparently capable of rapidly producing high strength solid state welds, thus require extreme care to maintain the degree of metallurgical cleanliness required to promote bonding in both the short period of time the work piece ends remain hot (a few seconds) and without excess flash.

Diffusion bonding (interchangeably known as diffusion welding) is typically performed at stresses below that required to produce macroscopic deformation (i.e., plastic flow), and for most materials including carbon steel requires substantially oxide-free faying surfaces. The bond formation occurs over time (in the order of hours or minutes, not seconds) at elevated temperature (typically more than half the melting temperature). By contrast, conventional forge welds, such as commonly used to produce ERW (electric resistance welded) tubular products, do not require the same degree of cleanliness or time to form a bond, but these benefits come at the expense of requiring substantial plastic flow generating an upset or flash. At the forge weld temperature, typically in the recrystallization range, this plastic flow reduces bond sensitivity to the presence of oxides, because the associated large plastic deformation of the metal crystals promotes the absorption and disruption of the oxides in addition to extruding a portion into the flash, which often must be removed.

Seen in this context, it will be apparent that the weld methods taught by Alford et al, and Moe, while demonstrating that rapid 'diffusion quality' welds are metallurgically achievable, are relatively fragile. They are only able to enjoy the benefits of smaller flash size compared to typical forge weld requirements by providing ultra-clean faying surfaces, and they are only able to enjoy the benefit of shorter bond time (compared to typical diffusion weld requirements) by introducing significant macrosopic plastic deformation; i.e., flash size.

Another solid state welding process intended to meet this same industry need is the "rapid friction welding method" disclosed by Lingnau in patent application PCT/US99/25600, "Improved Method of Solid State Welding and Welded Parts". This reference discloses a modified friction welding method in which the majority of the energy supplied to heat the work pieces to the hot working temperature is provided by induction pre-heating (in a non-oxidizing environment), rather than solely by kinetic energy as in conventional friction welding. This method, as described by Lingnau, enjoys several benefits over conventional friction welding, some of the primary benefits being:

- large kinetic energy storage devices, such as fly wheels, or high power drives are not required, thus resulting is less bulky and costly mechanical equipment;
- welds can be formed at lower surface speeds and thus rotation frequency, which is often a practical barrier, particularly in joining long tubulars; and
- reduced, thinner flash results in less material waste, and in some applications flash may be small enough to leave in place, thus eliminating manufacturing steps otherwise required for flash removal.

Even though the Lingnau method requires only a fraction of the kinetic energy of conventional friction welding ("approximately equal to 10%", per claim 1 in Lingnau), the relative velocity between the work pieces must nonetheless be at "an initial perimeter velocity of about four feet per second [1.2 m/s]" (page 8, lines 18-19), or "the forging velocity [about 200 ft/min, or 1.026 m/s, for steel] which is much lower than the normal minimum friction welding surface velocity of 500 to 3,000 ft/min [2.54 to 15.24 m/sec] for steel" (page 10, lines 9-11). Consequently, substantial rotation or relative displacement is still expected. For example, in referring to joining 4.5 inch [114.3 mm] diameter pipe, Lingnau teaches that, "Once the hot working temperature is reached, the two work pieces are pressed together at the forging pressure, causing the rotating work piece to decelerate almost instantly, within a few revolutions." The rotation referred to is in addition to that required prior to contact. Particularly when joining long tubular work pieces, this amount of total rotation or 'spinning' still introduces additional complexity and technical limitations for many applications, as for example, at pipeline tie-ins.

Similarly, while reducing the magnitude of flash generated in producing a weld compared to conventional friction welding, the method retains the concept of forging force, a uni-directional compressive force, as a necessary part of the friction weld process. It will be apparent that the hot material on the faying surfaces is thus subjected to high axial stress while simultaneously undergoing shear arising from the imposed relative transverse movement, typically imposed by rotation. This stress state necessarily results in extrusion of a significant volume of hot material, as flash, during the forge process.

In common with other friction welding, this method does not explicitly control the amount of hot working due to shear. According to accepted understandings, the large amount of shear typically imposed during friction welding of steel can sometimes lead to elongated low strength non-metallic inclusions, such as manganese sulphide (MnS), at or near the bond line. Such inclusions tend to promote crack initiation reducing weld strength, toughness and fatigue resistance.

This modified friction welding method, while avoiding the fragility of the 'modified diffusion weld' taught by Alford et al. and Moe, yet retains much of the operational complication or clumsiness of friction welding, associated with the need for continuous initial rotation or movement plus substantial kinetic energy input. In particular, it is advantageous if the relative movement between the work pieces can be accomplished at lower surface velocity and lower relative transverse displacement to effect a weld, even eliminating the need to "spin" altogether, while simultaneously tending to prevent excessive hot working and associated deleterious metallurgical effects, and, secondly, to further reduce the flash magnitude or eliminate it entirely.

BRIEF SUMMARY OF THE INVENTION

A shear-assisted solid state welding method has been invented for bonding metal parts. This welding method exploits the bonding behaviour of hot contacting parts, preferably in a substantially inert environment, to provide a new solid state welding process that introduces shear strain into hot layers of material immediately adjacent the contact interface or faying surfaces to rapidly form a diffusion-like bond. The imposed shear strain greatly accelerates the rate at which the bond forms, relative to typical diffusion bonding under static strain conditions, in a manner somewhat analogous to the effect that stirring has on diffusion rates in liquids. Similar to typical forge or upset welding, this bond forms most readily if the material is in the hot working temperature range. (Hot working temperature is generally understood herein to mean a temperature in the range below melting but sufficiently high so as not to create strain hardening during plastic deformation, where the lower limit of temperature for this characteristic is generally known as the recrystallization temperature.)

Similar to these existing weld methods, the present invention thus provides a method to bond mating surfaces of metal parts at elevated temperature without melting. Yet unlike with diffusion welding, the bond in accordance with the present invention can be created in the order of seconds or even fractions of a second. Unlike with friction welding, bonding does not require significant (or any) relative sliding between the surfaces to dissipate kinetic energy, thus minimizing or eliminating the need for initial relative velocity between the surfaces, and entailing total displacement distances that are much lower even than those typically associated with induction-assisted friction welding. Unlike with conventional forge welding, the imposed strain in the present method does not tend to produce a large upset or flash. Furthermore, the method of the present invention facilitates almost complete control of flash size, independent of 'forging force' requirements for forge or friction welding. This shear-assisted solid state welding method is suitable for joining segments of pipe, such as would be useful in pipelines, well bore drilling and casing operations, and other applications where any or all of its advantages of short weld time, minimal sliding with minimal transverse or shear movement, controlled flash size, and minimally disturbed microstructure are beneficial.

Thus, in accordance with a broad aspect of the present invention, there is provided a solid state welding method for joining of metal work pieces that have opposing, generally mating surfaces. In one embodiment, the method of the invention comprises the steps of:

heating the mating surfaces, preferably in a non-passivating (e.g., non-oxidizing) environment, to a temperature in the metal's hot working range, with the heating and mating surface geometry being adapted to create a "hot layer" (i.e., a controlled thickness of material within the hot working range) adjacent to each surface, one or both of which hot layers will tend to preferentially localize shear strain under application of shear stress on the surface, and with hot layer thickness being controlled by regulating the temperature gradient normal to the mating surfaces and/or by selectively adjusting the area of the mating surfaces;

bringing the surfaces into contact while still at their hot working temperature and applying compressive stress sufficient to induce frictional resistance to transverse or shear loading across the interfacial region, at least equal to the shear strength of the material at its hot working temperature;

imposing transverse displacement of one work piece relative to the other, which transverse displacement under said contact conditions (i.e., the shear displacement) induces plastic shear strain in the material making up the hot layer, which shear strain progressively induces bonding or cohesion in the interfacial region, where the magnitude and rate of induced plastic shear strain are controlled to remain within limits governed by properties of the materials being bonded and contemporaneous thermal conditions, which limits are generally understood to include:

bond activation shear strain: which is the minimum shear strain magnitude sufficient to obtain complete bonding or cohesion of the interfacial region (the corresponding process stage intended to at least impose said bond activation shear strain magnitude through shear displacement is referred to herein as the bond activation stage), minimum shear strain rate: average minimum shear strain rate required to ensure the bond activation stage is complete before the material bounding the interfacial region cools below the hot working temperature, maximum shear strain rate: strain rate above which adiabatic shear bands or other instability mechanisms may develop;

where the mode of said shear displacement may be selectively varied (e.g., orbital, oscillatory, rotational, or reversing), simultaneous with introduction of said shear displacement, controlling the relative axial position of the parts not only to achieve said initial compressive stress, but also to maintain sufficient axial compressive stress across the contact surface during the bond activation stage to prevent slippage and promote bonding, and optionally to subsequently impose additional axial strain, in the now bonded hot layers, to meet desired limitations of final flash volume; which axial strain may even be reversed (i.e., tensile), where said axial strain can be imposed in coordination with additional shear strain to correlatively reduce the axial stress as governed by the associative flow characteristics of metal.

Heating of the opposed mating surfaces may be accomplished by various means including electrical resistance and high frequency induction heaters. Heating may be accomplished with the surfaces in contact or separated.

Resistance heating may be configured in many ways. This method of heating is commonly used for seam welding of tubulars referred to as ERW (Electric Resistance Welded) pipe. However, it may be configured to also heat mating generally axi-symmetric surfaces, as for example, in U.S. Pat. Nos. 4,736,084 and 5,721,413 where methods employing electric resistance (contact electrodes) for heating closely spaced end portion of two pipes are shown.

Induction heating enjoys the benefit of not requiring contact to induce electric current to flow in the work piece, resulting in resistive power loss and associated heating. In U.S. Pat. No. 4,669,650 a method commonly used to induction heat tubular or similar axi-symmetric work pieces by coaxial placement of an external induction coil in close proximity to the work piece surface is employed to locally heat the material bounding the mating surfaces of two work pieces in contact. Means to further concentrate the magnetic field in the region of contact may be employed as described in U.S. Pat. No. 4,947,462 where the induction coil is enclosed in a ferromagnetic cover. Such placement of the induction coil beside (i.e., in the plane of) the mating surfaces while facilitating heating of surfaces in contact is only suitable for heating relatively thin-walled sections, since temperature decreases with distance from the coil; i.e., temperature gradients in the plane of the mating surfaces.

In PCT/US99/25600 a single coaxial induction coil is placed between more widely separated mating surfaces and employed to simultaneously heat both mating surfaces. This configuration, while requiring the work pieces to be moved a greater distance after heating to achieve contact, promotes more uniform heating in the plane of each separate mating surface and thus facilitates welding of thicker sections. The application requirements will thus determine which method of induction heating is preferred. For thinner sections, heating with an external coaxially-placed coil may be preferred to avoid the extra mechanical complexity required to move the work pieces into contact after heating (perhaps also preceded by coil movement).

However, the use of a single induction coil to simultaneously heat two surfaces as shown in PCT/US99/25600, while enjoying certain architectural simplicities introduces significant practical difficulty in achieving uniform heating of both surfaces. As will be apparent to one skilled in the art, the single induction coil is electromagnetically coupled to both work pieces during heating. It thus tends to preferentially heat the nearest surface. To prevent overheating of one surface or underheating of the other, the coil must therefore be positioned accurately to balance the relative gap size between the coil and each separate work piece surface.

For these and other practical reasons, one embodiment of the apparatus of the present invention (particularly suited to welding thicker sections) employs at least two induction coils. During heating, these coils are placed opposed to and in close proximity to the mating faces to be welded, to provide means to rapidly reach the hot working temperature as required to weld according to the teachings of the present invention. Such plurality of coils avoids the dual coupling sensitivities of a single coil. This method of heating readily enables independent control of the temperature distribution normal to the surfaces of the work pieces to be welded, and facilitates manipulation of this distribution to create a large temperature gradient normal to the surface, thus providing a comparatively thin "hot layer" of lower strength material forming the controlled thickness of material adjacent to each surface. This method of heating also flexibly facilitates provision of additional post-weld heat treatment, as is well known in the art, to additionally control the weld properties.

As will be apparent to one skilled in the art, the duration, amplitude and frequency of the induction heater current, combined with the heating coil geometry, its relation to the mating surfaces, and other heater design variables, may all be arranged to control the heat input and depth with time. Such control of heat input with time is thus arranged in the present invention to ensure a hot layer of sufficient thickness is provided to ensure that the interface temperature at the time of contact or shortly thereafter is sufficient to effect rapid cohesion or bonding of the material being welded, and to control the cooling rate during and after the welding process. This control of cooling rate is combined with timing of the welding steps to ensure that all or most of the shear strain is imposed while the material is at the hot working temperature, and also to control the post-weld cooling rate to advantageously influence metallurgical and mechanical characteristics of the weld, such as toughness.

Similar to most diffusion processes, the rate at which the cohesion develops across the interfacial region increases with temperature even within the hot working temperature range. Even though the rate of bond formation is greatly accelerated by the presence of plastic strain, there thus tends to be a minimum temperature required to stimulate bonding rapidly enough to completely bond the interfacial region during the bond activation stage, which temperature is typically somewhat greater than the recrystallization temperature (i.e., the lower bound of the hot working temperature range). This minimum weld temperature is preferably established empirically for the materials being welded by weld trials conducted at temperatures progressively greater than the recrystallization temperature, until full bonding is observed to occur for a given shear strain input. A temperature sufficient to stimulate rapid cohesion is preferably present at the time of contact to minimize the required shear displacement. However, in will be apparent that the work energy, input through plastic shear strain, also tends to heat the material and may thus be used to increase temperature after contact and thus promote a higher rate of cohesion.

Where the method of heating requires separation of the surfaces during local heating, it will be appreciated that following heating, the surfaces must be brought into contact relatively quickly to prevent cooling below the hot working temperature while shear strain is being imposed. As will be further explained below, although the shear strain does introduce additional mechanical energy that is transformed into heat, and thus tends to increase temperature, the amount of mechanical energy heating correlative with the shear strain imposed to effect the bond, is not necessarily large in comparison to the heat loss from conduction and convection cooling. Thus, unlike in friction welding, process control of the present welding method is not strongly dependent on this mechanical energy as a source of heat. As will be made more apparent below, heating due to energy loss from plastic shear strain input typically forms a small or even negligible contribution compared to the contribution from sliding friction in friction welding. Nonetheless, as taught above, this does not preclude the use of heat loss from shear strain to raise temperature and thus promote more rapid bonding for the present method.

Inherent to the concept of friction in friction welding, is that of mechanical energy being applied to produce relative sliding between surfaces in contact to generate heat in the interfacial region. One novelty of the present invention, in contrast to such friction welding principles, is the discovery that in the presence of shear strain, a solid state bond can be induced to occur in a very short time, without requiring the input of heat from friction between the parts being bonded. The implementation of some embodiments of the method of the present invention may be incidentally accompanied by sliding between the mating surfaces as they are brought into contact, thus generating frictional heat, but such sliding and resultant frictional heat will be insignificant in magnitude and in any event are not essential to the invention.

To minimize or eliminate sliding, axial compressive stress must be kept at a magnitude equal to or greater than the imposed shear stress divided by the friction coefficient characteristic of the contacting surfaces at hot working temperature during the initial introduction of shear strain. As bonding or cohesion is stimulated in the interfacial region by the progressive introduction of shear strain, the axial stress required to prevent slippage correlatively decreases, so that once cohesion of the interfacial region is largely complete, the axial stress may in fact be transitioned from compressive stress to tensile stress without causing cavitation or voidage, during subsequent shear displacement induced plastic flow. This behaviour, allowing tensile axial strain to be introduced concurrent with shear strain, readily facilitates control of flash size, as described below.

The limits of minimum shear strain magnitude and rate required to effect a bond have been found to depend on the nature of the materials to be bonded. Thus to bond between a given combination of contacting materials, a minimum shear strain magnitude, referred to herein as the bond activation shear strain, must be reached while the material is in the hot working temperature range. For such combination of materials, the bond activation shear strain is readily determined empirically in coordination with the required temperature regime as discussed above, in terms of the shear displacement distance. It will thus be seen that the distribution of strain between the two materials need not be independently determined.

It will be apparent to one skilled in the art that the magnitude of plastic shear strain in the of bonding is generally inversely proportional to the sum of the hot layer thicknesses divided by the imposed transverse displacement magnitude. The amount or transverse displacement required to produce the minimum shear strain magnitude is thus controlled by the hot layer thicknesses. It will also be apparent that to localize plastic shear strain in this region, the work piece must be weakest with respect to shear load immediately adjacent the mating surfaces than elsewhere. As indicated, two means to locally weaken the work piece at the mating surface and thus control shear strain localization, defining the hot layer thickness, are therefore provided: either the material yield strength may be locally reduced by local heating, or the section area reduced in the work piece region immediately adjacent the mating surface or bond line. These means may be used either separately or in combination depending on the method of heating and application requirements.

For example, referring to the induction heating methods already described applied to welding mating ends of tubular work pieces, direct rapid heating of the tubular end faces with induction coils allows control of hot layer thickness by imposing a high temperature gradient normal to the heated surface. Alternatively, where induction heating is provided by coils placed beside the mating tubular end surfaces, high temperature gradients normal to the mating surfaces are not as readily achieved. For this heating configuration, control of the strain localization interval length, and hence the hot layer thickness, can be achieved by wall thickness reduction over a short interval at the mating work piece ends.

Minimum shear strain rate is governed by two factors. First, shear strain must be introduced quickly enough to prevent cooling below the hot working temperature until after strain input is substantially complete, because the required minimum shear strain magnitude (bond activation shear strain) must be achieved while the material is still at its hot working temperature. Second, during the initial bond activation stage requiring axial compressive stress sufficient to prevent slippage between the parts being joined, the magnitude of flash extruded is dependent on the viscoelastic plastic material properties in the confined hot layers. Particularly due to the viscous effect on flow behaviour under these conditions, flash magnitude becomes smaller for higher strain rate; i.e., shorter time during which axial load is present to reach the required bond activation shear strain. Therefore, shear strain rate may be used as a further means to effect control over flash size.

While no specific maximum boundary for shear strain magnitude has been identified, in general all or most of the shear strain must be imposed before cooling below the hot working temperature to avoid risk of excess work hardening or even fracture. The plastic shear strain may be imposed in any direction, including full reversal. This characteristic facilitates applications where it is desirable for the initial and final relative transverse positions of the mating parts to be the same, such as for pipe line tie-ins.

Although shear strain magnitude does not appear to have an upper bound, an upper bound for shear strain rate has been found for some materials, and may generally be attributed to adiabatic shear band softening or similar material instability occurring under high plastic flow rates. It will be appreciated that the hot layer thickness must also be accounted for in relating sliding distance to shear strain and rate, in addition to control of temperature with time; i.e., a thinner hot layer is generally preferred, as this reduces the sliding distance required to achieve sufficient strain. However, hot layer thickness impacts directly on the volume of material in which the thermal energy is stored. This thermal energy is needed to prevent excess cooling before the shear strain is fully imposed; therefore, this requirement imposes a practical lower bound on the minimum hot layer thickness.

As will be understood by one skilled in the art, for purposes of describing flash size, the volume of material in the bond zone undergoing plastic deformation may be considered constant since the metal is effectively incompressible (Poisson's ratio ~0.5 during plastic flow). This implies that negative or compressive axial strain extrudes material, increasing the flash size while positive or tensile axial strain retracts material, tending to decrease flash size. It will then be evident that the requirement to provide axial compressive stress sufficient to prevent sliding during the early portion of the shear displacement, when the bond is being initiated, necessarily results in an increase of flash size.

However, it is a further purpose of the present invention to beneficially exploit additional aspects of this simple relationship, where in one embodiment means to combine load and displacement control to manage the relative axial displacement between the work pieces as a function of shear displacement are provided, rather than only providing unidirectional compressive load control, as typically employed for friction welding. With such means to control axial strain provided, following the early bond forming interval of shear displacement, in this embodiment the flash size may be reduced by drawing the work pieces apart; i.e., imposing tensile axial strain after initial bonding, while shear displacement continues. This tensile axial strain rate may be much smaller than the imposed shear strain; hence the axial stress state need only become slightly tensile. (This aspect of plastic flow behaviour is analogous to the compound friction effect where a large sliding distance in one direction reduces the frictional resistance to small orthogonal displacements.)

This means of reducing flash size is preferred over imposing axial tensile strain after the shear strain is stopped, because the required axial stress is thus minimized, reducing equipment load requirements and likelihood of cavitation or 'hot tearing'. Nonetheless, certain applications may gain other benefits, such as improved flaw detection, if axial strain is imposed separate from shear strain. Unlike a process implemented with only means to apply unidirectional axial displacement provided, this embodiment readily enables the use of numerous such load paths to thus better suit the needs of various applications.

As already pointed out, it is inherent to the concept of friction in friction welding that there must be relative sliding between surfaces to generate heat. Relative to such friction welding understandings, the discovery that a solid state bond can be formed without significant (or any) relative sliding between surfaces enables the present process to be implemented with relative displacements between the surfaces and the associated speed of relative movement in the interfacial plane being dramatically less than required for known solid state welding methods, even induction-assisted friction welding process. Similarly, according to the teachings of the present invention, the amount of shear strain introduced by the weld tends to be minimized, thus reducing the tendency to form elongated inclusions as often occurs in friction welds, which only indirectly limit the amount of shear strain imposed during welding.

To demonstrate that the induction-assisted friction welding process necessarily entails significant sliding, it is helpful to consider an example given by Lingnau in patent application PCT/US99/25600 (at page 10, lines 1-28). In that example, induction-assisted friction welding parameters for 0.157 inch [4 mm] wall thickness, 4.5 inch [114.3 mm] diameter carbon steel tube are described where the kinetic energy required is given as 1,978 ft-lb/inch$^2$ [4.157 J/mm$^2$] compared to 26,000 ft-lb/inch$^2$ [54.64 J/mm$^2$] for conventional friction welding. As noted earlier, Lingnau contemplates relative displacements after the work pieces are in contact of "a few revolutions" and contact to be initiated at "an initial perimeter velocity of about four feet per second [1.22 m/sec]" (page 8, lines 18-19), even though the associated kinetic energy input is "approximately equal to 10% of the energy input prescribed by conventional friction welding" (per claim 1). Under these conditions, even two revolutions of 114.3 mm (4.5 inch) diameter pipe would correspond to a sliding distance under contact of approximately 760 mm (28 inches). Dynamic shear strength of similar steels at hot working temperature has been measured by the present inventors and falls in the range of 42 to 69 MPa (6,000 to 10,000 psi). That a significant amount of sliding is still anticipated can be shown by noting that the kinetic energy required to impose just one revolution or 380 mm (14 inches) of relative surface movement without sliding is given by the relationship: mechanical work per unit of surface area=shear strength×distance, or between 29.4 and 49.0 J/mm$^2$ (14,000 and 23,333 ft-lb/inch$^2$) for the present example. Over two revolutions, this is from 7 to 12 times more than the 4.157 J/mm$^2$ (1,978 ft-lb/inch$^2$) actually imposed. Therefore, much of the displacement must occur under sliding friction conditions, and not substantially without sliding as taught by the present invention.

For the present solid state welding method, relative shear displacements in the order of 25 mm (1 inch) have been found to impose sufficient shear strain to bond carbon steel tubular parts with a hot layer thickness of similar depth to that given in the example, 0.050 inches [1.27 mm]. The associated mechanical work to induce this amount of shear displacement is 1.05 to 1.75 J/mm$^2$ (500 to 833 ft-lb/inch$^2$), which is about 2% of the 54.64 J/mm$^2$ (26,000 ft-lb/inch$^2$) considered typical for conventional friction welding For this example, the present process is thus seen to fall well below the kinetic energy limits of being "approximately equal to 10% of the energy input prescribed by conventional friction welding", taught by Lingnau. It is thus generally better understood in terms distinct from that of even modified friction welding where relative thermal and mechanical energy contributions are there considered relevant control variables, and axial stress is considered in terms of "forging force". (For these processes, the reference to kinetic energy in the context of friction welding understandings is more generally described as mechanical work that is converted to heat. This source of heat is understood to be additive to the thermal energy introduced by induction heating to provide sufficient total energy input, which total energy input is treated as a control parameter.)

Control of the present process thus dispenses with some of these earlier understandings and seeks to define the process control in terms of imposed temperature distribution, rather than energy input, combined with shear and axial displacement control in time rather than rotational speed and forging force. However, it will be understood by one skilled in the art that such description does not preclude combined multi-variable control strategies.

In one of its embodiments, it is a further purpose of the present invention, to provide means to simultaneously weld multiple discontinuous opposing matched surfaces. Such discontinuous surfaces occur in applications where dual concentric tubulars or similar geometries must be joined. For such applications the discontinuous surfaces are similarly matched to ensure that largely simultaneous contact occurs when the surfaces are brought together after heating.

It is a yet further purpose of the present invention to provide a method for welding matched opposing non-planar axi-symmetric surfaces. According to the teaching of the present invention, the direction of shear strain input to effect a bond may be varied. Therefore if the matching surfaces are planar, that is parallel and flat, the shear strain may be input by an almost infinite number of path shapes including, orbital, oscillating linear translation or rotation. However, where the matching surfaces to be joined are axi-symmetric, the work pieces will be aligned coaxially when the surfaces are arranged to be opposing, as required to weld according to the method of the present invention. Therefore, they need not be planar if the relative shear displacement is input as relative rotation. For example the surfaces may be arranged with generally matching frustoconical or truncated toroidal shapes. In certain applications, such variants from a planar surface shape may provide additional utility in controlling temperature distribution, alignment under contact, flash shape, or overall weld strength. Furthermore, the degree of matching may be varied so that contact does not occur simultaneously over the entire interfacial region as the parts are brought together.

Typical friction welding apparatus are designed to weld axi-symmetric first and second metal work pieces having mating surfaces by spinning the first work piece, often attached to a large flywheel, and forcing the mating surface of the non-rotating second work piece against the spinning first piece with a forge force or axial stress sufficient to frictionally stop the first piece from spinning while simultaneously heating the region of contact sufficient to effect a weld. To join similar largely axi-symmetric work pieces, the shear-assisted solid state welding method of the present invention, while still requiring the motions of rotation and axial displacement and associated torque and axial load, only requires rotation providing a circumferential displacement in the order of 50 mm. Furthermore, such conventional machines typically lack the precise displacement control necessary to most beneficially implement the method of the present invention.

It is therefore an additional purpose of the present invention to provide a welding apparatus, particularly suitable for performing solid state shear-assisted welding of first and second work pieces having largely axi-symmetric mating surfaces where the transverse or shear displacement required to perform a weld is provided by rotation. Such welding apparatus comprises a main body having a first and second end provided at its first end with first gripping means adapted for releasably gripping a first work piece in fixed relationship to the main body. Attached to the second end of the main body is a dual-axis hydraulic actuator, comprising an actuator body having first and second ends, and containing concentric intermediate and inner double-acting hollow bore pistons, each having first and second ends corresponding to the ends of the actuator body, and referred to as forge and rotary pistons respectively, where the forge piston acts as the cylinder for the rotary piston and is provided with a second gripping means adapted for gripping a second work piece. The first and second gripping means may comprise a vise or chuck or any functionally comparable device well known in the art. Extension or retraction of the forge piston (which in the preferred embodiment will be effected by hydraulic means) thus causes axial movement relative to the actuator body, while extension or retraction of the rotary piston (again, preferably by hydraulic means) causes axial movement relative to the forge piston; i.e., the rotary piston is carried by the forge piston. Under the preferred hydraulic control of extension and retraction, the forge piston and rotary piston thus act in series.

The first end of the actuator body is rigidly attached to the second end of the main body and arranged so that the second gripping means carried on the forge piston is aligned in opposition to the first gripping means fixed to the main body, thus providing a means to orient the mating end surfaces of the first and second work pieces in opposition to each other. The second ends of each of the nested actuator body, forge piston and rotary piston are respectively attached to a similarly nested and close-fitting assembly comprising an outer sleeve provided with a plurality of axial slots, an intermediate cam profile sleeve which is preferably provided with helical slots distributed circumferentially to match with the axial slots provided in the outer sleeve, and an inner spider flange carrying outwardly radial shafts provided with cam followers that pass through and independently engage each of the helical and axial slots. By thus linking the axial motions of the actuator body, forge ram and rotary ram, a mechanism is provided whereby relative axial movement of the rotary piston causes rotation of the forge piston independent of the forge piston's axial position relative to the actuator body. Suitably equipped with, for instance, servo-hydraulic control, this architecture provides a simple and robust means to accurately position the second work piece relative to the first work piece and to facilitate control of rapid axial movement to bring the mating surfaces into contact after heating, followed by precise displacement control of axial and shear strain.

Providing the cam profiles of the intermediate cam profile sleeve as a helix and the outer sleeve as axial slots supports the needs of many applications. However, it will be apparent that the linked motion of the forge piston may be further varied by providing these cam profiles in other forms. For example, in applications where reversing or oscillatory motion is beneficial, this motion may be obtained by hydraulic control of the rotary piston direction. However, mechanical support for such rotation control may also be achieved by providing the intermediate cam profile sleeve with sinusoidal, saw-tooth or other slot profiles. In addition, it is intended such mechanical control be applied to the slot profile of the outer sleeve whereby the straight axial motion may varied to facilitate control to, for example, initiate rotation just as the surfaces are brought into contact. This may be readily achieved by providing slots in the outer sleeve that are helically oriented over at least a portion of their length. These and other variations in motion control are all facilitated by the welding apparatus described.

BRIEF DESCRIPTION OF THE DRAWINGS

Embodiments of the present invention will now be described with reference to the accompanying figures, in which numerical references denote like parts, and in which.

DETAILED DESCRIPTION OF THE PREFERRED EMBODIMENT

Figure 1:
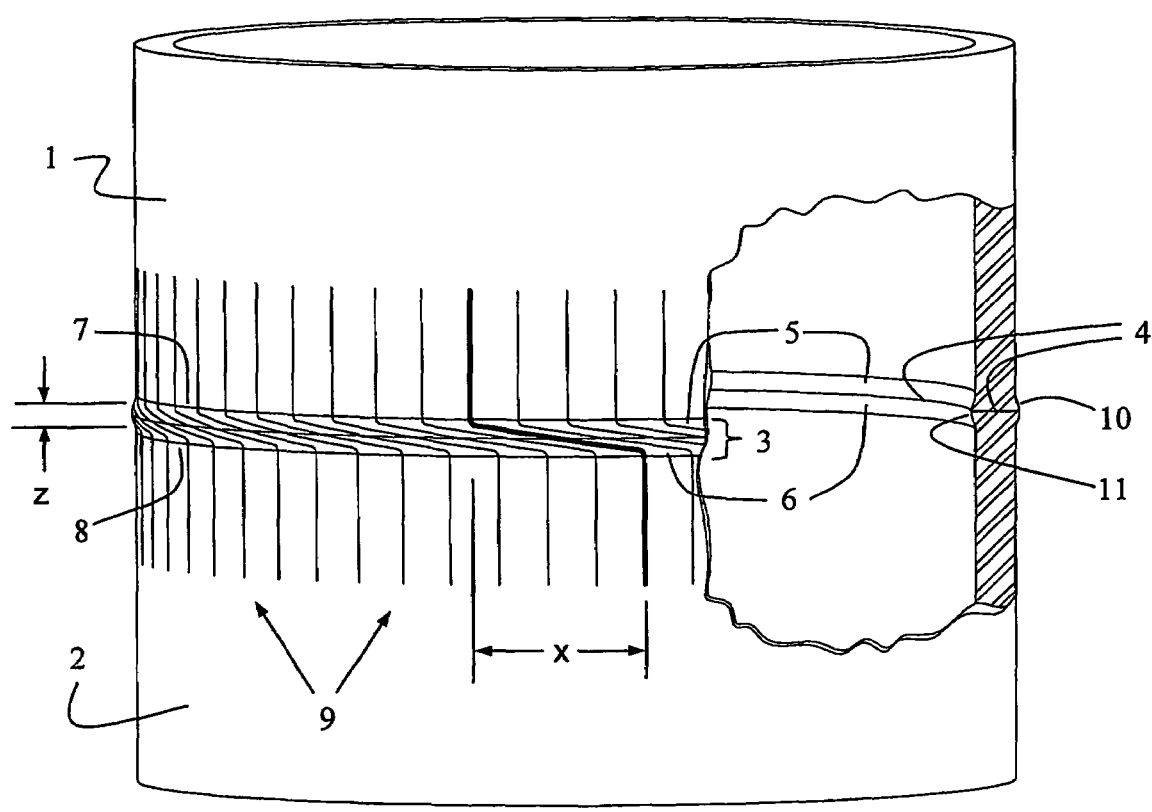
FIG. 1 is a partial cutaway view of tubular work pieces welded in accordance with a first embodiment of the method of the invention.

FIG. 1 illustrates a shear-assisted solid state weld formed by the preferred method of the present invention as it appears in a welded tube or pipe. In FIG. 1, a first metal tubular work piece 1 is coaxially welded to a second metal tubular work piece 2 to create a weld zone 3. The weld zone 3 is bisected by a bond line 4 and is generally defined by first and second heat affected zones, 5 and 6, on the welded ends 7 and 8 of the first and second work pieces respectively.

According to the preferred method of the present invention, the shearing required to activate the bond in weld zone 3, as described above, is input as uni-directional coaxial relative rotation between work pieces 1 and 2. In such case, axial reference lines scribed along the work pieces 1 and 2, prior to welding, would be distorted and appear as curved lines 9 after welding, which lines show the plastic shear distortion imposed by the welding process. It will be apparent that where line slope is steepest the local strain magnitude is greatest. The majority of the plastic shear distortion occurs in the material at the hot working temperature, thus the combined hot layer thicknesses, represented by dimension z, are evident as the intervals bounding the bond line 4, where the slopes of curved lines 9 are generally steepest.

Under conditions of unidirectional shear displacement, the total imposed shear displacement is represented by distance x, and generally occurs across the hot layer thicknesses so that the average plastic shear strain magnitude is herein characterized by the relation x/z. It will be apparent that this generally corresponds to the slope of lines 9 at the bond line 4. To join common carbon steel, it was found this shear strain must be approximately 10 or greater; i.e., the bond activation shear strain is in the order of 10 for this material.

Referring still to FIG. 1, the sidewall cross section view through weld zone 3 shows the characteristic exterior and interior flash, 10 and 11 respectively, obtained for welds employing the present method using only unidirectional compressive axial strain control. Under these control conditions the flash shape, as illustrated, is rounded (i.e., having a low aspect ratio), and the bond line is continuous to the flash extremities, minimizing or eliminating the tendency to leave a notch, as is characteristic of friction welds. This notch is typically undesirable as it creates a stress riser and corrosion initiation site. Similarly, the low aspect ratio or rounded character of the present weld also reduces the stress riser effect of the flash compared even to that obtained using the modified induction-assisted friction welding method taught by Lingnau. Therefore, in many applications that would otherwise require flash removal if friction welded, this step generally is unnecessary for welds formed by the method of the present invention even implemented using only unidirectional compressive axial strain control.

Figure 2:
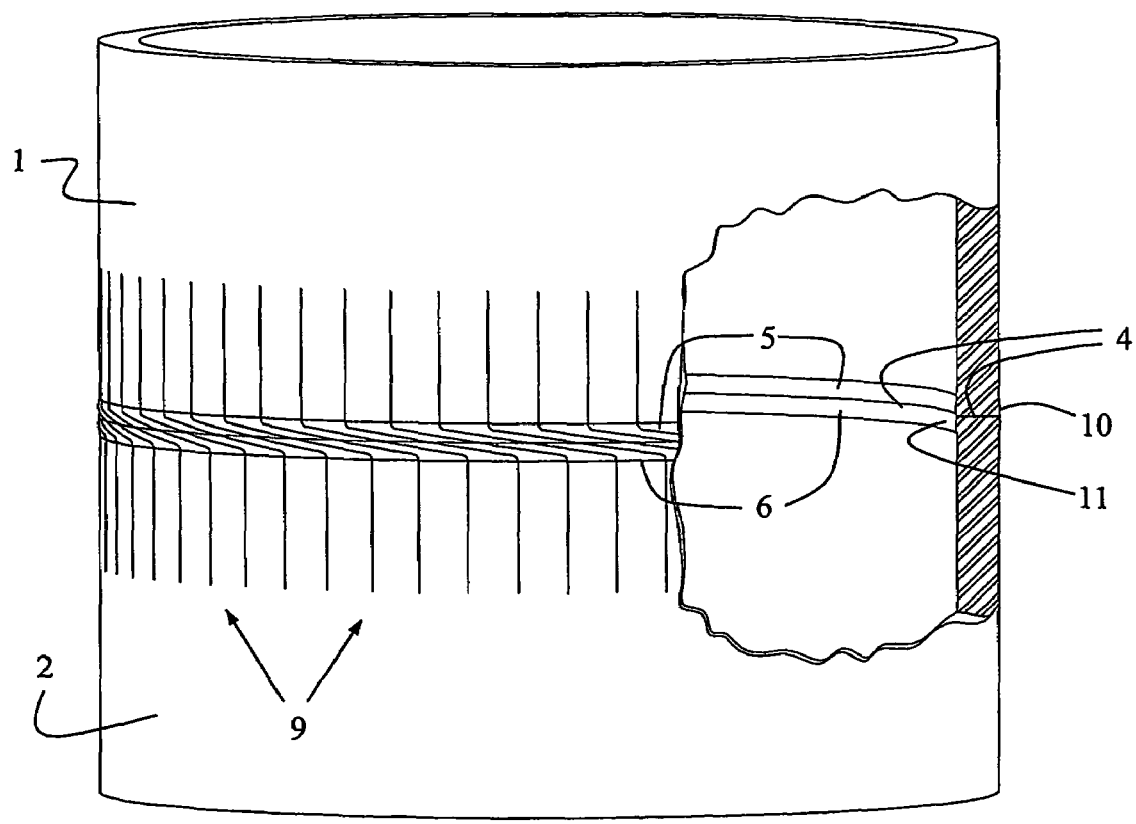
FIG. 2 is a partial cutaway view of tubular work pieces welded in accordance with a second embodiment of the method.

Referring now to FIG. 2, a weld made according to an alternative embodiment of the method of the present invention is illustrated where tensile or extensive axial strain control has been imposed subsequent to the bond activation stage. In this case, the flash is virtually eliminated, thus providing even greater benefits in applications where even minimal flash upsetting is disadvantageous.

Figure 3:
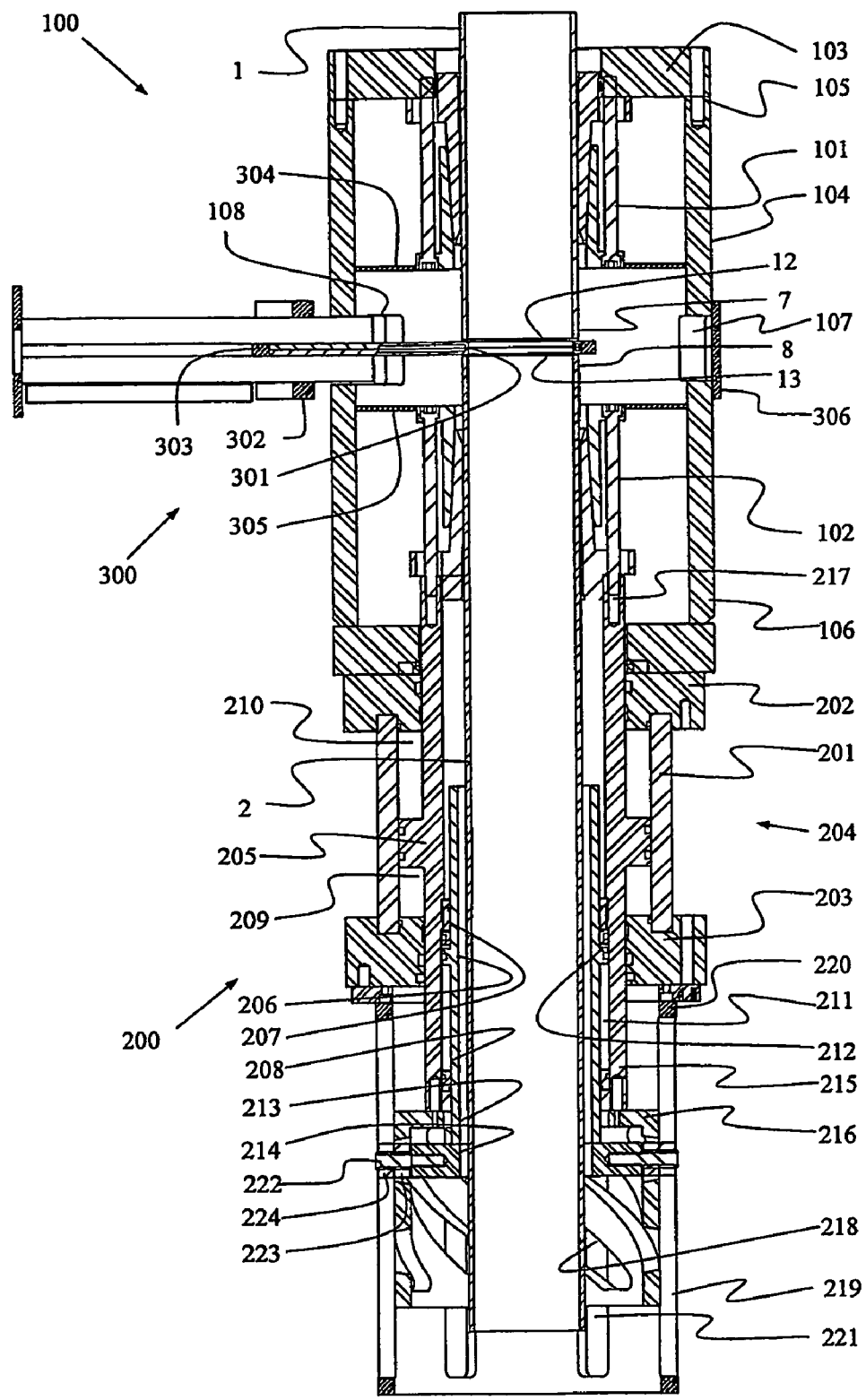
FIG. 3 is a side cross-sectional cutaway view of an embodiment of the apparatus of the invention, as it would appear preparatory to welding tubular work pieces as shown in FIGS. 1 and 2.

Referring now to FIG. 3, manufacture of such axi-symmetric weldments is facilitated through provision of a fixture 100 enabling shear-assisted solid state welding of work pieces, such as first and second tubular work pieces 1 and 2, provided with smooth, square-cut ends 7 and 8 respectively, that form matching axi-symmetric surfaces 12 and 13 respectively. First and second tubular work pieces 1 and 2 are gripped in upper and lower chucks 101 and 102 respectively. Upper chuck 101 is attached to reaction flange 103, itself attached to main body 104 at its upper end 105. Reaction flange 103 is preferably configured to include a load cell capable of measuring axial and torsional loads transmitted through it. Main body 104 is comprised of a heavy wall tubular having an upper end 105 and lower end 106 and provided with appropriately positioned induction heater coil access and general access openings 107 and 108 respectively.

At its lower end, 106 main body 104 is attached to dual-axis hydraulic actuator sub-assembly 200 comprising:

(a) outer cylinder 201, provided with upper and lower end caps 202 and 203 respectively, having seals and bushings as typically known in is the art, which together with outer cylinder 201 comprise actuator body 204;

(b) intermediate forge piston 205 coaxially placed inside and sealingly engaging actuator body 204; and (c) inner rotary piston 206 coaxially placed inside intermediate forge piston 205, with upper and lower sealing bulkheads 207 and 208 respectively, provided with seals and bushings as is well known in the art, and placed in the annular region between inner rotary piston 206 and intermediate forge piston 205 to which they are attached, thus forming two nested hollow bore hydraulic pistons, with the intermediate forge piston 205 functioning as the cylinder for inner rotary piston 206.

Axial movement of these actuators will preferably be accomplished by providing means for pumping hydraulic fluid under servo-hydraulic control into and out of sealed annular extension and retraction cavities, 209 and 210 respectively for intermediate forge piston 205, and 211 and 212 respectively for the inner rotary piston 206.

Inner rotary piston 206 is arranged as a double-acting hollow bore piston having a lower end 213 rigidly attached to cam follower support flange 214. Intermediate forge piston 205 is attached at its lower end 215 to rotary cage 216 and at its upper end 217 to lower chuck 102 supporting the second work piece 2. Rotary cage 216 is generally cylindrical, provided with a plurality of evenly spaced helical cam slots 218, and arranged to fit closely inside axial cage 219 and outside cam follower support flange 214. Axial cage 219 is generally cylindrical having and upper end 220 and provided with a plurality of evenly placed axial cam slots 221 matching the helical cam slots 218. The upper end 220 of axial cage 219 is rigidly attached to lower cylinder end cap 203 and thus acts as an extension of the actuator body 204.

Radial shafts 222 are attached to cam follower support flange 214, and extend through each pair of helical cam slots 218 and axial cam slots 221. Inner and outer cam followers 223 and 224 are mounted on each of the radial shafts 222 and arranged so that the inner cam followers 223 engage the helical slots 218 in rotary cage 216 and the outer cam followers 224 engage the axial slots 221 in axial cage 219. With this arrangement, the forge piston 205, and hence second work piece 2, may be independently rotated or moved axially, relative to the main body 104, depending on the hydraulic extension or retraction control of the rotary and forge pistons 206 and 205 respectively. This independent controllability is described in further detail below.

Rotation control: With extension or retraction of the forge piston 205 prevented by hydraulic control of flow to extension and retraction cavities 209 and 210 respectively, extension or retraction of the rotary piston 206 causes rotation of forge piston 205, because the outer cam followers 224 engaged in the axial slots 221 constrain the radial shafts 222 to only move axially. Since these shafts are common to the inner cam followers 223 engaged in helical slots 218, axial movement of the radial shafts 222 can only be accommodated by rotation of the rotary cage 216 and hence the forge piston 205 to which it is attached. It will be apparent that this relationship between axial movement of rotary piston 206 and rotation of forge piston 205 is governed by the pitch or helix angle of helical slots 218, which angle is selected in combination with other design variables such as piston area, stroke, pump pressure and flow volume to provide sufficient torque and rotation capacities for the size of work piece to be welded. In particular, the stroke of rotary piston 206 and the length of helical slots 218 are selected in combination with the helix pitch to provide rotation sufficient to impose the shear displacement necessary to weld work pieces in a selected range of sizes.

Axial control: With extension or retraction of the rotary piston 206 prevented by suitable hydraulic control, extension or retraction of forge piston 205 directly causes axial movement of second work piece 2, while rotation is prevented by engagement of outer cam followers 224 engaged in axial slots 221. Suitably equipped with pressure and displacement sensors integrated with servo-hydraulic feedback control in a manner well known in the art, fixture 100 thus readily facilitates process control of axial displacement, contact force, rotation and torque imposed on second work piece 2 relative to first work piece 1.

Figure 4:
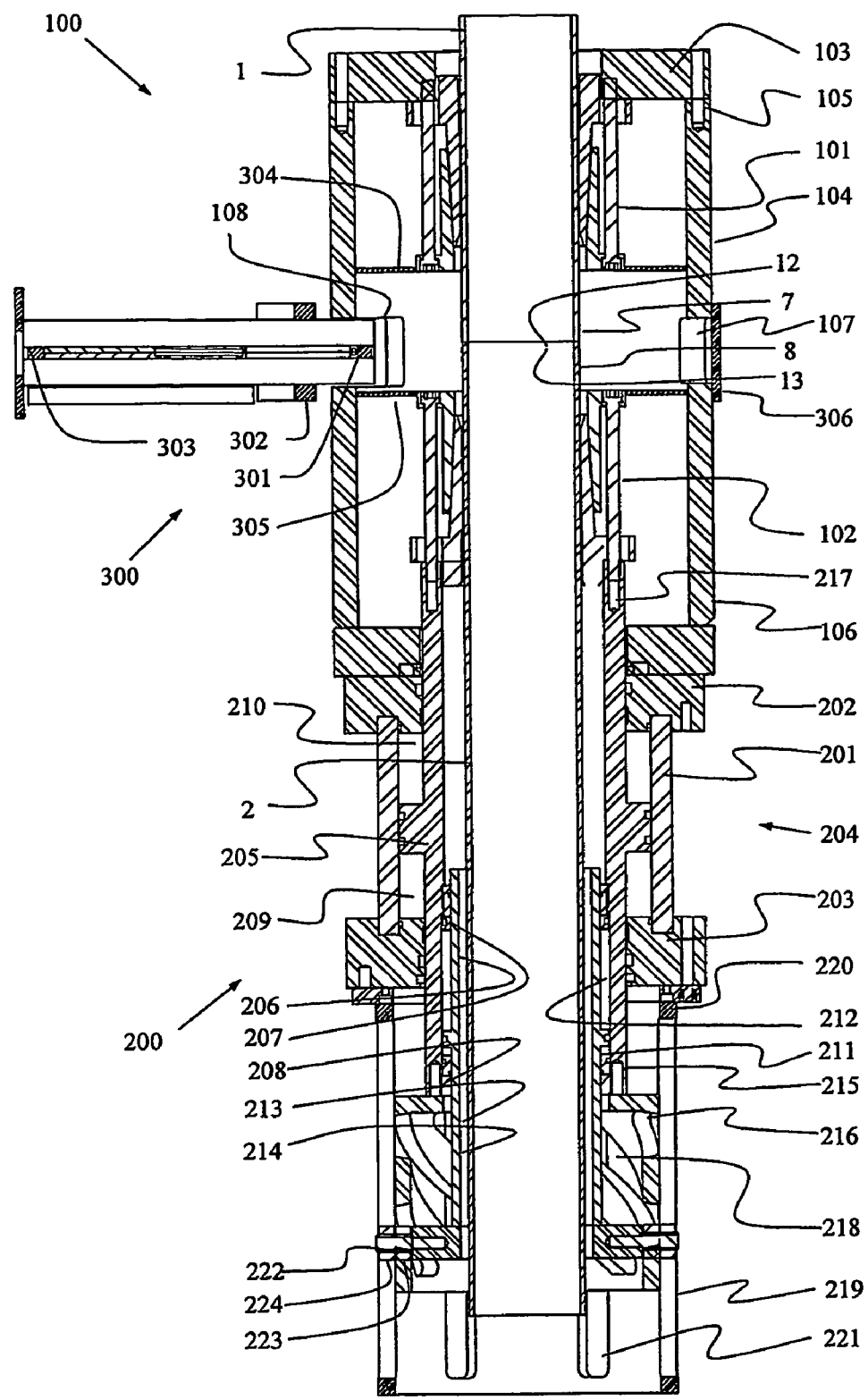
FIG. 4 is a view of the apparatus shown in FIG. 3 as it would appear upon completion of the weld.

In its preferred embodiment, fixture 100 is further provided with an induction heating coil system 300, comprising one or more induction coils 301, slidingly supported in a carrier 302 mounted to the main body 104, and arranged so that the coil may be positioned coaxially between the matching end faces 12 and 13 of work pieces 1 and 2 for heating (as shown in FIG. 3), and retracted prior to contact of surfaces 12 and 13 by suitable means such as a pneumatic actuator acting on the end connection 303 of induction coil 301 (as shown in FIG. 4). Referring again to FIG. 3, baffles 304 and 305 and cover 306 are provided to promote containment of a shielding gas such as nitrogen to thus provide a non-oxidizing environment during heating and welding. An induction power supply and cables are also provided and connected to one or more induction coils 301.

Where a single coil is used, it will be appreciated by one skilled in the art, that the geometry of the induction heating coil 301, its position relative to both the end faces 12 and 13 of work pieces 1 and 2, and the frequency, amplitude and duration of the coil-exciting current, may be variously controlled using commercially available induction heating power supplies to achieve a desired axial temperature profile on the work piece ends.

However, as discussed already, the use of a single induction coil to simultaneously heat two surfaces as illustrated in FIG. 3, while enjoying certain architectural simplicities introduces significant practical difficulty in achieving uniform heating of both surfaces. During heating, the single induction coil is electromagnetically coupled to both work pieces. It thus tends to preferentially heat the nearest surface. To prevent overheating of one surface or underheating of the other, the coil must therefore be positioned accurately to balance the relative gap size between the coil and each separate work piece surface. In its preferred embodiment, the induction heating coil system 300 is thus provided as dual coils which may be variously configured as will be apparent to one skilled in the art.

Figure 11:
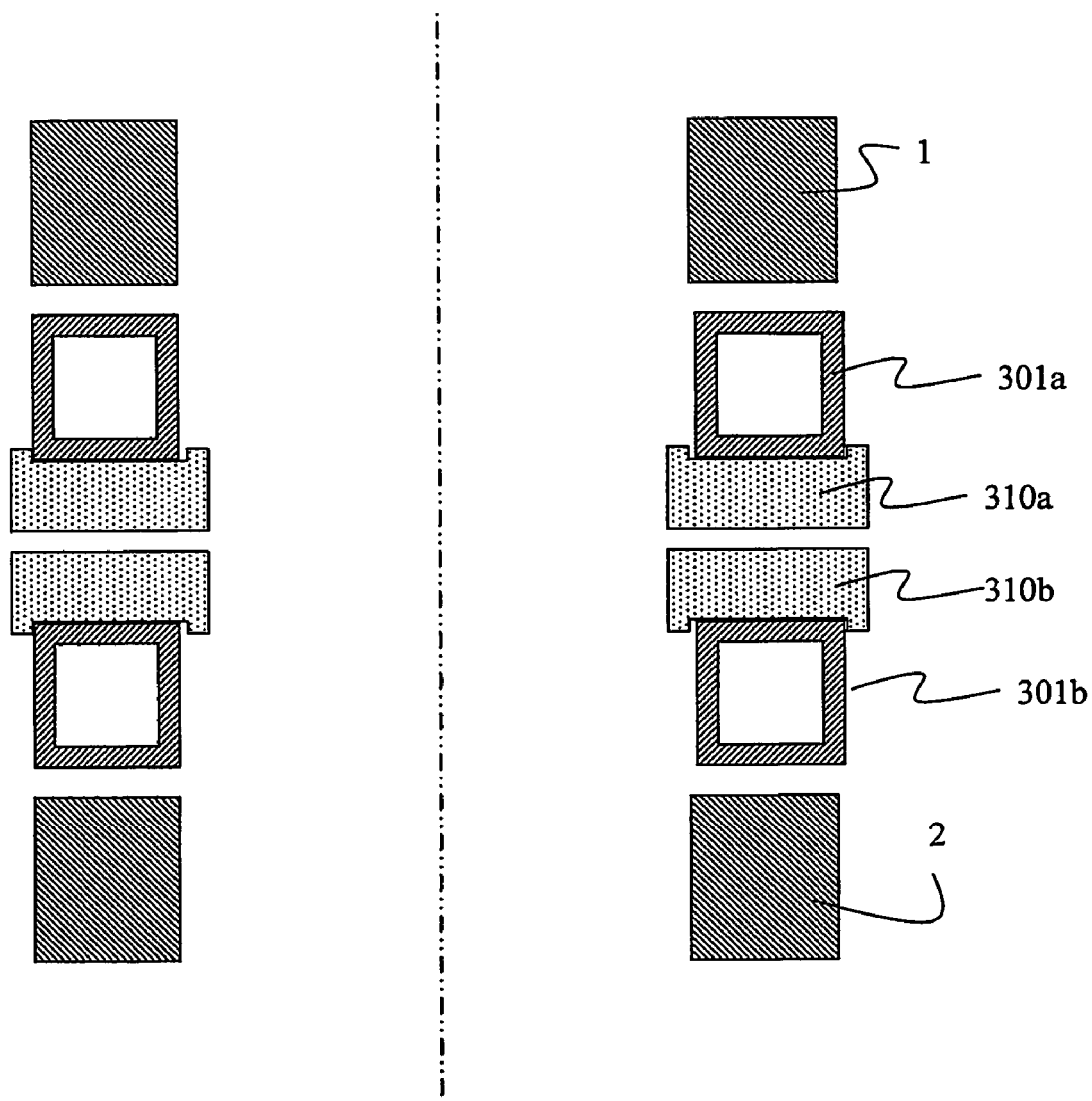
FIG. 11 is a schematic cross-section of an alternative induction heating coil arrangement using a pair of coils provided with ferromagnetic shielding.

Referring now to FIG. 11, one such arrangement is shown with twin coils 301a and 301b, separated by shields 310a and 310b of ferromagnetic material to increase the magnetic field intensity causing heating of the mating surfaces and to reduce electromagnetic coupling between the coils. This arrangement, using ferromagnetic shielding, facilitates closer spacing of the dual coils. Alternatively, electromagnetic coupling may be reduced by increasing coil separation, correlatively requiring greater axial travel to bring the mating surfaces into contact after heating.

The novel architecture of fixture 100, and particularly the dual-axis motion (i.e., axial and rotary) of hydraulic actuator sub-assembly 200, facilitates the imposition of axial and shear strain, with associated loads, necessary to hot work the metal work pieces during welding as required to implement the method of the present invention in a particularly advantageous fashion, compared to known friction welding equipment commonly used to effect similar or analogous welding movements and forces. Compared to such other equipment architecture, fixture 100 does not require the heavy bearings normally required to accommodate rotation under high forging forces, beyond the seals and bushings commonly provided with such hydraulic actuators. It therefore requires minimal mechanical complexity to impose rotation, and readily provides the high stiffness needed for accurate displacement control.

The hollow, through-bore actuator facilitates welding of long tubulars, such as required for pipeline or well construction. The simplicity of this architecture provides numerous other benefits, such as compact packaging, modest capital cost, greater reliability and movement relative to the fixture body confined to only one work piece, of value in many applications such as pipeline or casing assembly where the welding method of the present invention may be implemented.

It will be understood that references herein to upper and lower with respect to the drawings of fixture 100 are not meant to imply dependence on gravitational direction; hence the axis of fixture 100 may be oriented horizontally as would be generally preferred for welding on pipelines.

In operation, fixture 100 facilitates welding according to the preferred embodiment of the present invention where, referring to FIG. 3, the face 12 of first work piece 1 is positioned in upper fixed chuck 101 relative to the coil 301, as it would appear preparatory to and during heating, so that a controlled gap is obtained, sufficiently large to ensure electrical isolation but close enough to obtain satisfactory inductive field coupling between the coil and the first work piece 1 to heat its face 12. Similarly, the position of second work piece 2 in lower moving chuck 102 and the position of forge piston 205 are adjusted to obtain a similar gap between the end face 13 of work piece 2 and coil 301, where the position of forge piston 205 is further arranged to have sufficient stroke to bring the end faces 12 and 13 of work pieces 1 and 2 into contact, with the coil 301 retracted. Rotary piston 206 is typically set in a fully retracted position prior to welding.

Following positioning of the work pieces, with the coil extended, shielding gas is introduced into the enclosed space sufficient to substantially purge oxygen from the environment in contact with the work piece end faces 12 and 13 until they are in contact. Once the environment is thus purged, induction heating of the work pieces is commenced and continued until the contacting surfaces are above the minimum bond temperature in the hot working temperature range and the layer of material underlying the surface on each work piece is therefore also in the hot working temperature range, thus forming a hot layer at the ends of each work piece. The coil is then retracted and the work pieces are brought into contact under displacement control in a sufficiently short time period to prevent cooling of the work piece surfaces below the hot working temperature. Rotation is preferably commenced immediately prior to the surfaces coming into contact and coordinated with axial displacement to continue the controlled imposition of axial interference so as to prevent substantial slippage while rotation simultaneously imposes shear strain at least equal to the bond activation shear strain to thus complete the weld. FIG. 4 shows welded work pieces 1 and 2 in fixture 100 as they appear after the weld is complete.

Figure 5:
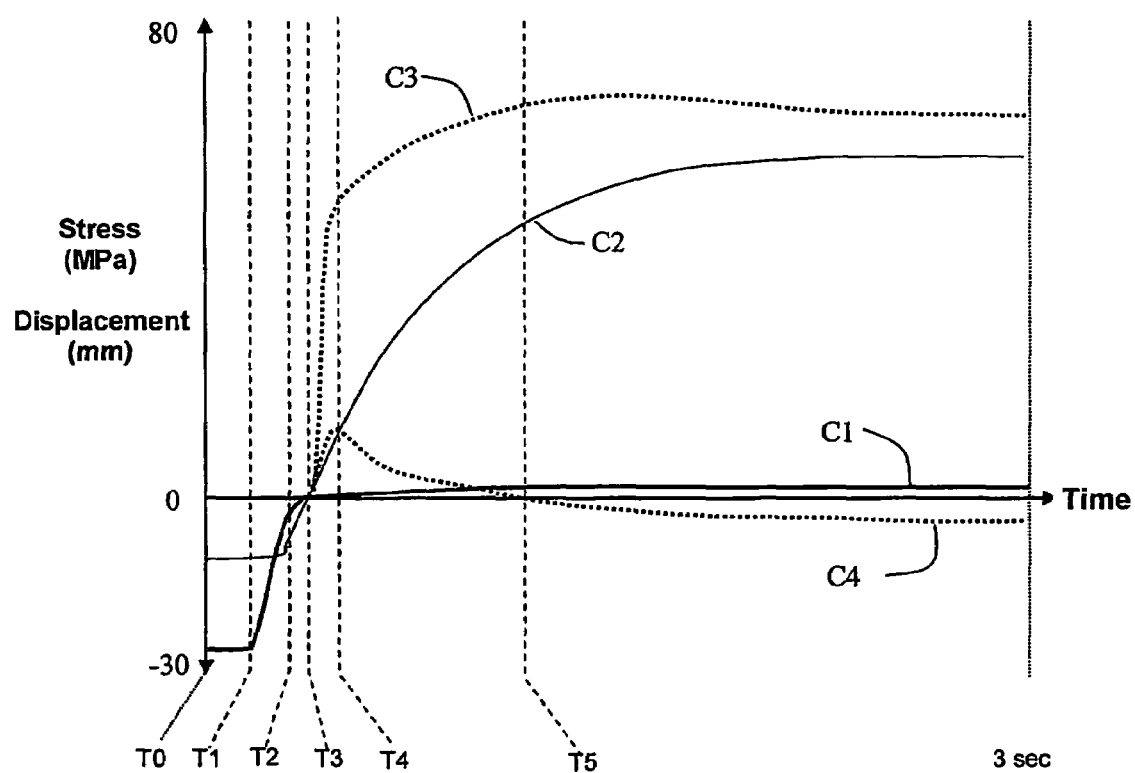
FIG. 5 is a plot on a linear time scale illustrating key process parameters while forming a weld in accordance with a first embodiment of the method of the invention, as depicted in FIG. 1.

Referring now to FIG. 5, key process parameters after heating is complete are illustratively plotted in time as they correspond to the sequence of steps just described for the operation of fixture 100 during welding of carbon steel according to the preferred embodiment of the method of the invention. In this plot, displacement is referenced to the position at contact, and time is shown starting when heating is just complete. The scale shown for stress, displacement and time is intended to be illustrative of typical values found for welding 178 mm outside diameter 8 mm thick carbon steel pipe, and should not be considered normative.

Curve $C_1$ shows the relative axial position of the work pieces based on forge piston displacement; i.e. negative values correspond to a gap between the mating faces of the first and second work pieces, and positive values correspond to interference or upset imposed by control of the forge piston. Curve $C_2$ shows the circumferential or shear displacement derived from axial displacement of the rotary piston. Curve $C_3$ shows the shear stress derived from measurement of torque, and curve $C_4$ shows the axial or forging stress derived from measurement of forging piston load. Since the hot layer thickness over which the plastic strain is distributed is the same for both axial and shear displacement, the relative displacement magnitudes shown are the same for strain.

Time $T_0$ corresponds to the end of heating and the initiation of coil retraction. At time $T_1$, coil retraction is complete and forge piston movement begins. Time $T_2$ corresponds to initiation of rotary movement and contact occurs at $T_3$ (although, it should be noted, $T_2$ and $T_3$ may coincide in alternative embodiments, or $T_3$ may in fact precede $T_2$). After contact, shear stress and axial stress both increase until time $T_4$ after which axial stress is allowed to decrease and may even become tensile as occurs in this example at time $T_5$ when the weld is largely complete. The bond activation stage thus occurs in the interval $T_3$ to $T_5$.

This plot shows that, in accordance with the teachings of the present invention, as contact is initiated, axial compressive stress is correlatively increased with shear stress, so that the ratio of shear to axial stress is kept greater than the apparent friction coefficient of the surfaces at their hot working temperature, thus preventing slippage. However, as the amount of shear displacement increases and bonding correlatively increases, this ratio is allowed to increase so that axial stress is allowed to peak and then decrease and may actually become tensile. This control of axial strain and hence stress is directly contrary to the teachings of the prior art for friction welding, where a compressive 'forging force' is considered necessary throughout the weld cycle and indeed is preferentially increased and held as rotational arrest occurs. Similarly, the very short time required to effect a bond, in this example less than 3 seconds, is dramatically less than anticipated for diffusion bonding as known in the prior art.

The rate at which interference is introduced upon contact, relative to the rate of shear displacement, is used correlatively not only to minimize slipping, but also simultaneously to impose sufficient plastic deformation normal to the contact surface. This is beneficial to compensate for some amount of mismatch between the mating surfaces 12 and 13. This may be advantageously exploited so that the degree of matching required is not great; e.g., typical lathe-machined surface preparation enables high quality welds to be formed.

Referring still to FIG. 5, the final forge piston displacement as indicated by curve $C_1$ reflects the residual axial compressive strain and hence the flash volume for the preferred embodiment of the present invention. This preferred embodiment thus provides a modest amount of reinforcement in the weld region as illustrated in FIG. 1 by the volume of material in outer and inner flash 10 and 11 respectively. For the example given, the maximum thickness of the flash is approximately 25% of the pipe wall thickness. This is obtained with an upset length approximately 10% of the wall thickness. Such reinforcement is advantageous in many applications as a means to reduce stress through the heat affected zone and thus improve the strength of the welded connection so as to readily exceed that of the base pipe. Geometry control in the vicinity of the mating pipe ends, such as by pre-machining the pipe ends with inner and/or outer chamfers, may also be used to reduce the final weld upset size relative to the pipe wall thickness, but such chamfering adds additional cost.

Figure 6:
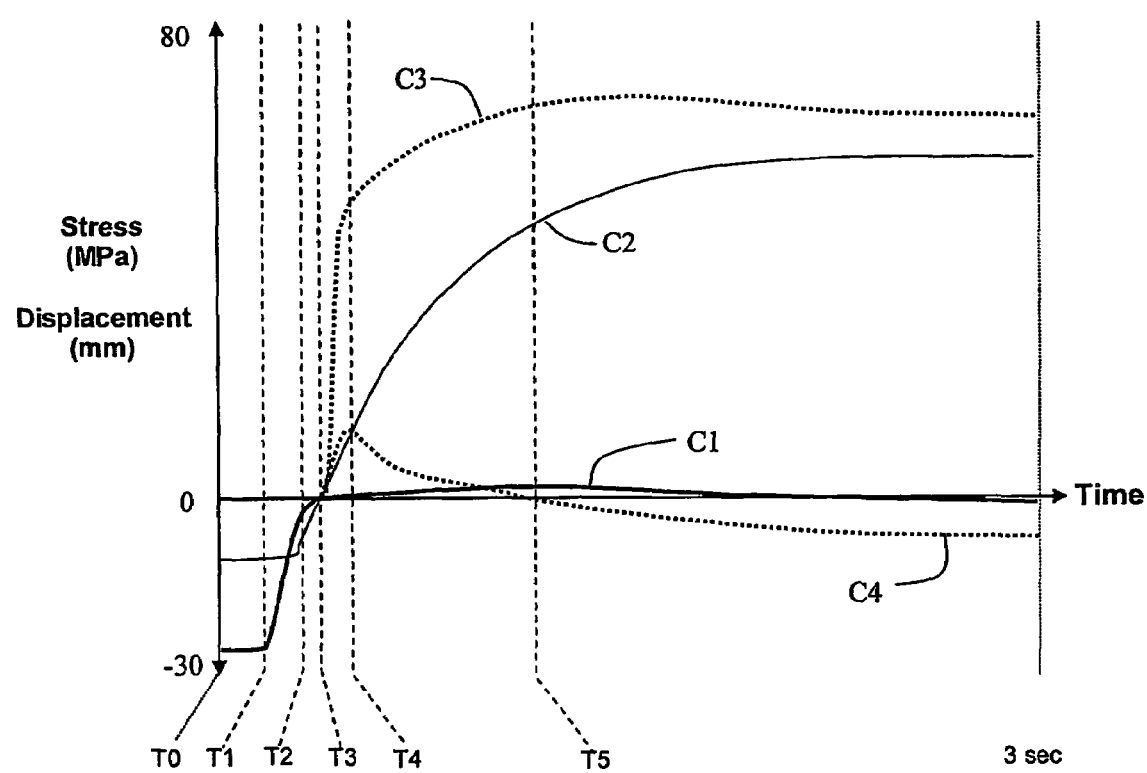
FIG. 6 is a plot on a linear time scale illustrating key process parameters while forming a weld in accordance with a second embodiment of the method of the invention, as depicted in FIG. 2.

For applications where even less flash is desirable without requiring such addition pre-machining, in an alternative embodiment the method of the present invention is applied to provide welds characterized by minimal flash. Referring now to FIG. 6, in this alternative embodiment the forge piston movement shown by curve $C_1$ is controlled to begin to decrease after time $T_5$, resulting in a final upset near zero. Compared to the process control shown in FIG. 5, this results in a slightly greater tensile axial stress, but because the shear strain rate (indicated by the slope of curve $C_2$) is simultaneously kept considerably greater than the axial strain rate (indicated by the slope of curve $C_1$), this tendency is minimized, as correspondingly is the tendency to increase the size of voids that would occur if axial strain were introduced in the absence of shear strain. This alternative embodiment thus provides a negligible flash as illustrated by the flash volume shown in FIG. 2.

Figure 7:
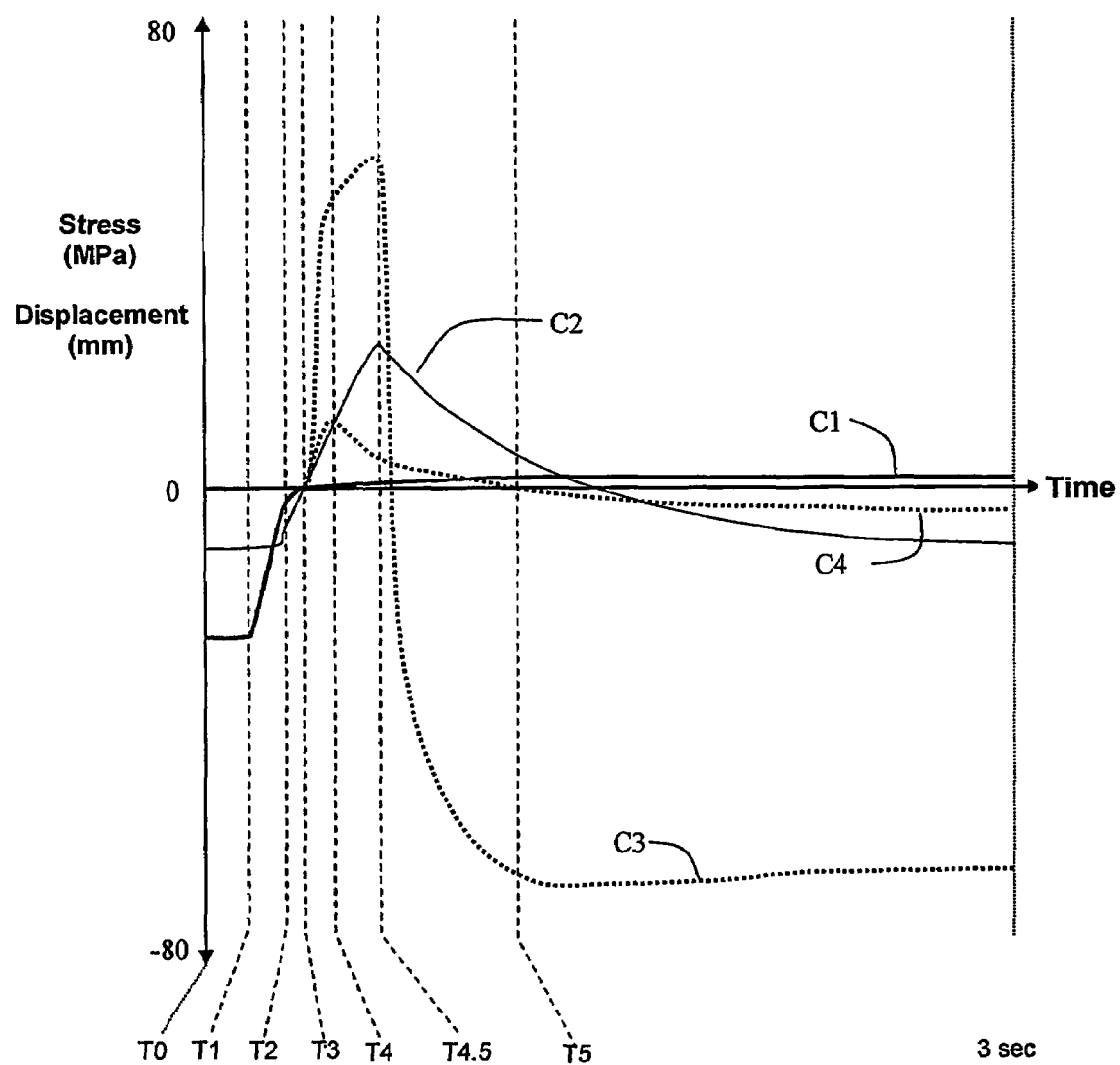
FIG. 7 is a plot on a linear time scale illustrating key process parameters while forming a weld in accordance with a third embodiment of the method of the invention, providing a weld similar to that depicted in FIG. 1 but with zero net final rotation.

In yet another embodiment of the present invention, fixture 100 shown in FIG. 3 may be readily employed to provide bi-directional shear strain control of the process, as illustrated in FIG. 7. In this alternative embodiment the direction of shear strain, and hence stress, is reversed at time $T_{4.5}$ for making welds where, for example, the initial and final rotary position is the same, as indicated by curve $C_2$ in FIG. 7. This characteristic facilitates applications such as pipe line tie-ins where neither of the work pieces is free to rotate and it is desirable to complete the weld without leaving residual torsion in the confined pipeline interval. It will be apparent that this is illustrative of numerous load path variations facilitated by this apparatus to exploit benefits potentially arising from the ambivalence to shear direction enjoyed by the welding method of the present invention. In some applications it may be advantageous to facilitate such rotational load paths by providing the cam slots in rotary cage 216 with a non-helical profile, such as a generally rounded saw-tooth profile to facilitate oscillatory rotation without requiring axial reversal of rotary piston 206.

Figure 8:
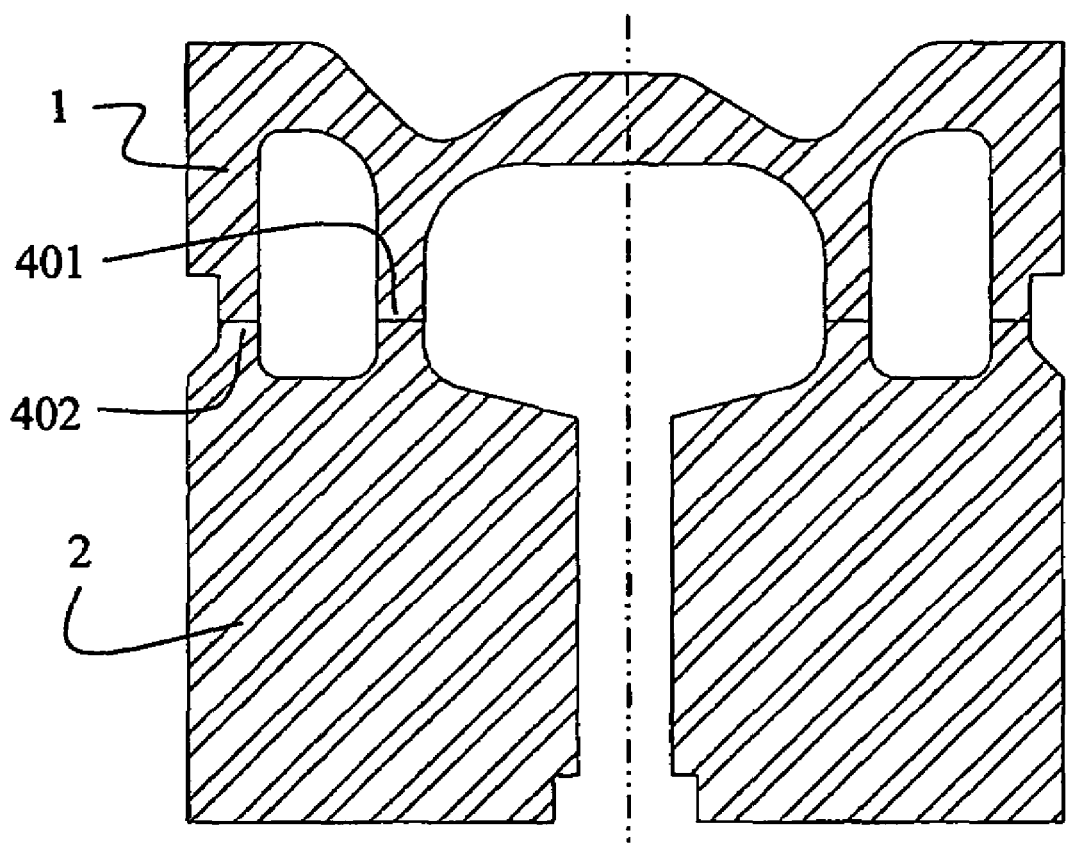
FIG. 8 is a cross-section of a weld between work pieces having two discrete annular lands welded simultaneously according to an alternative embodiment of the present invention.

In a further embodiment, the method of the present invention may be applied to simultaneously join two or more discrete mating surfaces. FIG. 8 illustrates one such geometry where the weld is formed between first and second axi-symmetric work pieces 1 and 2 having concentric mating raised annular inner and outer lands 401 and 402. This geometry requires coordination of heating the inside and outside rings to ensure that both regions are within the hot working temperature range prior to bonding. Where induction heating is used to control the temperature with a single coil placed co-axially between the mating ends also coaxially aligned, the coil must provide inner and outer loops where the geometry of said loops is adjusted to balance the heat input between the surfaces and thus ensure that the temperature constraints are met.

Figure 12:
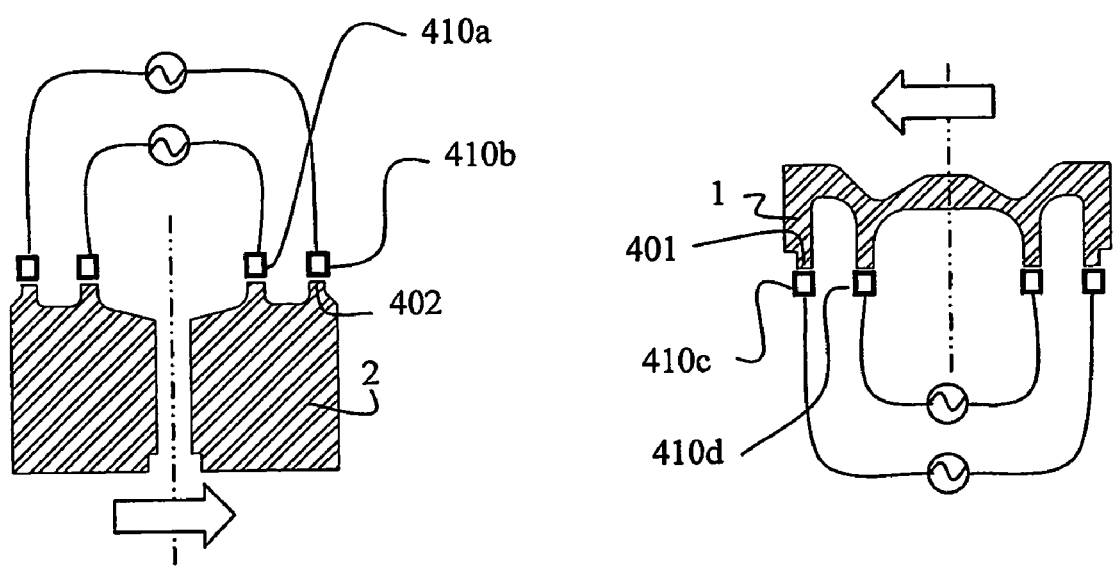
FIG. 12 is a schematic depiction of an alternative induction heating coil arrangement having four coils, illustrated for exemplary purposes in conjunction with work pieces as shown in FIG. 8.

While this arrangement may provide satisfactory results, it is preferable if two (or, even more preferably, four) independent coils are employed to perform the heating. In such coil arrangements, the work pieces need not be axially aligned during heating. An arrangement generally as illustrated in FIG. 12 can be used employing four independent coils and circuits 410a, 410b, 410c and 410d. Following heating, the work pieces are moved in the direction shown by the arrows into coaxial alignment preparatory to being welded using the shear-assisted solid state welding method of the present invention. In such arrangements, the coils may be disposed in fixed positions or they may be movable, as may be convenient or appropriate to suit particular applications.

In the example shown in FIG. 8, the discrete mating surfaces lie in the same plane. However, it will be readily apparent to persons skilled in the art that the method of the present invention is also adaptable to welding work pieces having multiple discrete mating surfaces that lie in different planes, provided that the planes are substantially parallel.

Figure 9:
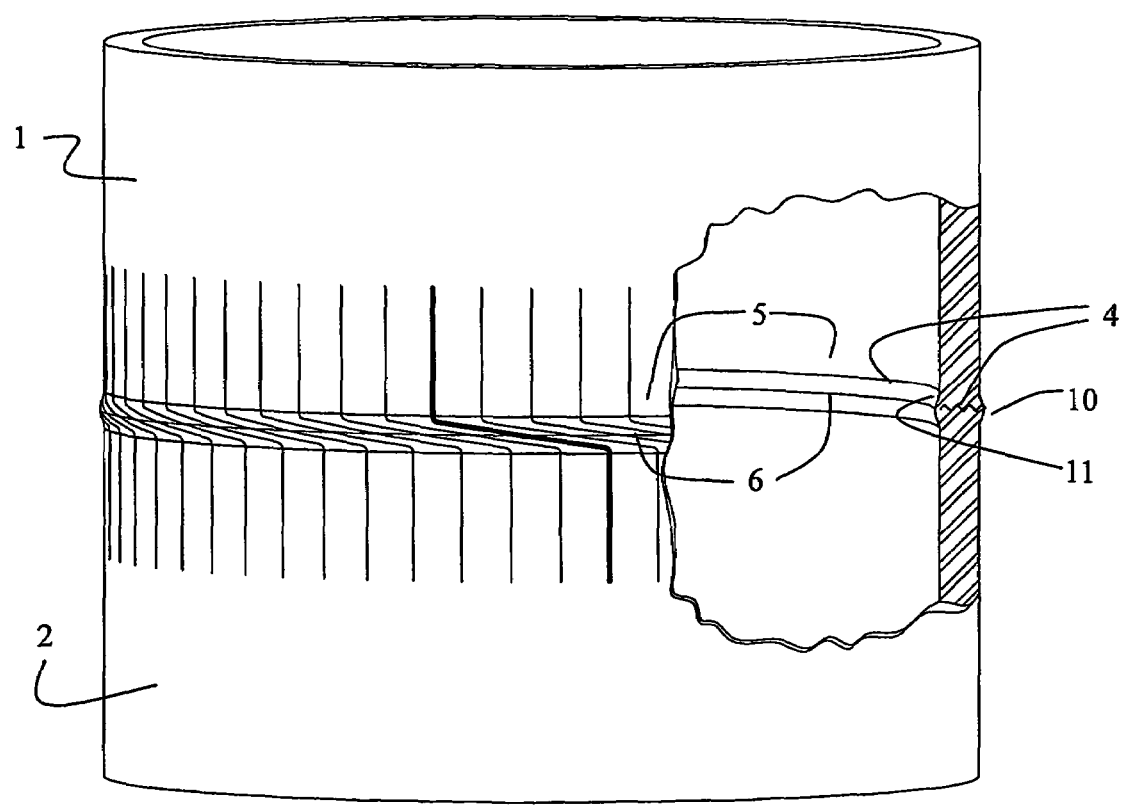
FIG. 9 is a partial cutaway view of a welded joint similar to that of FIG. 1 but having an interlocking rather than planar weld bond interface.
Figure 10:
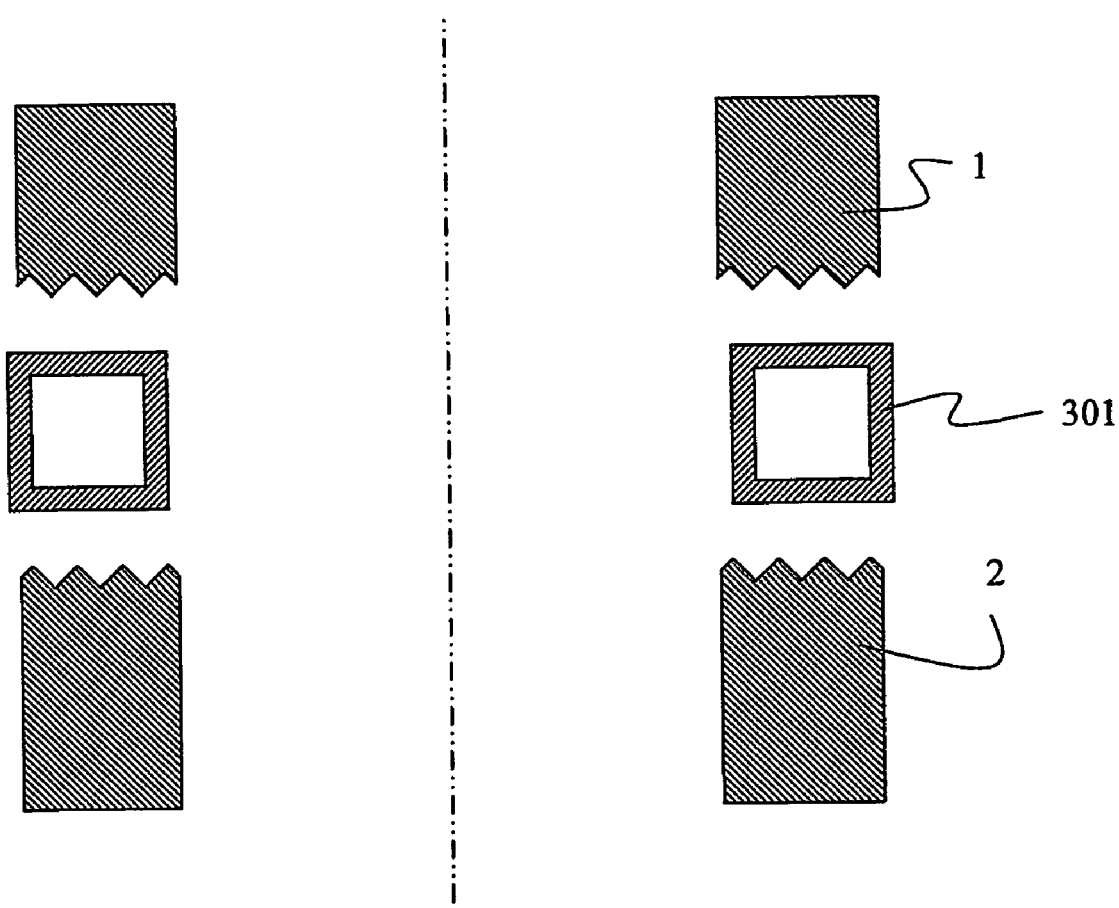
FIG. 10 is a schematic cross-section of an induction heating coil arrangement generally required according to an alternative method of the present invention to facilitate forming a weld as depicted in FIG. 9.

In another embodiment, the method of the present invention facilitates joining of non-planar axi-symmetric mating surfaces. FIG. 9 shows a pipe weld for one such geometry where the mating surfaces have a saw-tooth profile and thus the bond line 4 is appears jagged across the weld cross section. To implement the weld on this geometry using induction heating, the coil geometry may in general need to be arranged to follow or match the contour of the surface profiles to thus control the gap size between the coil and work piece surface and hence the rate of local heat input. However, where the saw-tooth profile is not great compared to the required gap thickness, such profiling of the coil may not be necessary. For example, FIG. 10 illustrates the induction heating coil 301 for the geometry of FIG. 9 in relation to the work pieces 1 and 2 during heating. It will be apparent that in general if the induction heater is must be contoured to obtain sufficiently even heating, removal by translation on a single plane may not be feasible, as the coil would interfere with the work piece ends. In such cases, various alternatives are available including axial movement of the coil in cooperation with movement of one or both work pieces preparatory to coil retraction, use of split coils, and other means known in the art.

The weld geometry of FIG. 9 may be advantageous in applications where it is desirable to rotate the orientation of the bond line relative the axial stress direction to gain strength and improve the arrest characteristics of cracks that might otherwise propagate through the full thickness of a planar weld.

The method of the present invention is particularly advantageous in that the preparation of the surfaces to be bonded does not need to meet stringent requirements. It has been found that satisfactory welds can be achieved despite the presence of oxides that tend to form on freshly machined carbon steel surfaces at room temperature in generally dry air. However, it has also been observed that the amount of shear strain that needs to be introduced to effect a bond tends to increase with the amount of oxidation or other impurities (e.g., oil or dirt) present on the mating surfaces. Accordingly, preferred embodiments of the invention will include a step for cleaning the surfaces to be bonded, as an additional means for controlling and minimizing the amount of shear strain required to make the desired weldment.

The cleaning step may entail any of numerous methods well known in the art. For example, oxides may be removed using mechanical abrasive means, preferably in the presence of a shielding gas such as nitrogen. Alternatively, oxide removal may be accomplished by chemical means; e.g., by exposing the mating surfaces to a reducing gas at elevated temperature.

It will be readily seen by those skilled in the art that various modifications of the present invention may be devised without departing from the essential concept of the invention, and all such modifications are intended to be included in the scope of the claims appended hereto.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

The embodiments of the invention in which an exclusive property or privilege is claimed are defined as follows:

1. A welding method for joining metal parts, said method comprising the steps of:
   (a) providing first and second metal work pieces, each work piece having a contact surface adapted for substantially mating engagement with the contact surface of the other work piece;
   (b) heating the work pieces so as to raise the temperature in a hot layer of metal adjacent to each contact surface to within the hot working range of the base metal of the work pieces;
   (c) bringing the contact surfaces into substantially mating contact while still in the hot working temperature range;
   (d) applying axial compressive load across the contact surfaces, said compressive load being sufficient to substantially prevent relative sliding between the contact surfaces in response to the imposition of transverse shear strain sufficient to induce plastic flow in the hot layers adjacent to the contact surfaces of the first and second work pieces; and (e) imposing transverse shear displacement between the work pieces, said shear displacement being sufficient to induce plastic shear strain within the hot layers to induce bonding of the work pieces in the interfacial region;

such that the contact surfaces remain in substantially mating contact throughout the imposition of transverse shear displacement between the work pieces, without substantial relative transverse displacement between the contact surfaces.

2. The welding method of claim 1 wherein the directional mode of the shear displacement is selected from the group consisting of orbital, oscillatory, rotational, and reversing.

3. The welding method of claim 1 wherein:
(a) the work pieces are made from carbon steel;
(b) the hot layer thickness of each work piece is approximately 1.25 millimeters; and
(c) the total relative shear displacement between the work pieces, as measured at the circumference of the joint, is at least approximately 25 millimeters.

4. The welding method of claim 1 wherein the total relative transverse shear displacement is at least approximately ten times the sum of the hot layer thicknesses of the work pieces.

5. The welding method of claim 1, comprising the further step of imposing additional strain normal to the interfacial region subsequent to initial bonding while at least a portion of the hot layers remain in the hot working range, so as to regulate flash volume.

6. The welding method of claim 5 wherein the additional normal strain is tensile strain.

7. The welding method of claim 5, comprising the further step of introducing additional transverse shear displacement in conjunction with the additional normal strain.

8. The welding method of claim 1 wherein the step of heating the work pieces is effected using induction heating.

9. The welding method of claim 1, further comprising the step of cleaning the contact surfaces prior to the step of heating the work pieces.

10. The welding method of claim 1, further comprising the step of cleaning the contact surfaces during the step of heating the work pieces.

11. The welding method of claim 1 wherein the contact surfaces are situated in a substantially non-passivating environment during the heating and bonding of the work pieces.

12. The welding method of claim 11 wherein the substantially non-passivating environment is provided by introducing a shielding gas in the vicinity of the contact surfaces.

13. The welding method of claim 12 wherein the shielding gas comprises nitrogen.

14. The welding method of claim 1 wherein the contact surfaces are substantially planar.

15. The welding method of claim 1 wherein the contact surfaces are interlocking.

16. The welding method of claim 15 wherein the interlocking contact surfaces comprise mating saw-tooth sections.

17. The welding method of claim 1 wherein the step of heating the work pieces is performed with the work pieces in axial alignment.

18. The welding method of claim 1 wherein the step of heating the work pieces is performed with the work pieces out of axial alignment, and comprising the further step of moving the work pieces into axial alignment after heating and prior to the step of bringing the contact surfaces into contact.

19. The welding method of claim 1 wherein each work piece has a plurality of discrete contact surfaces corresponding to discrete contact surfaces of the other work piece.

20. The welding method of claim 19 wherein the discrete contact surfaces lie in substantially the same plane.

21. The welding method of claim 19 wherein the planes of the discrete contact surfaces are parallel but offset from each other.

22. A welding method for joining metal parts, said method comprising the steps of:
(a) providing first and second metal work pieces, each work piece having a contact surface adapted for substantially mating engagement with the contact surface of the other work piece;
(b) bringing the contact surfaces into substantially mating contact;
(c) heating the work pieces so as to raise the temperature in a hot layer of metal adjacent to each contact surface to within the hot working range of the base metal of the work pieces;
(d) applying axial compressive load across the contact surfaces, said compressive load being sufficient to substantially prevent relative sliding between the contact surfaces in response to the imposition of transverse shear strain sufficient to induce plastic flow in the hot layers adjacent to the contact surfaces of the first and second work pieces; and
(e) imposing transverse shear displacement between the work pieces, said shear displacement being sufficient to induce plastic shear strain within the hot layers to induce bonding of the work pieces in the interfacial region;

such that the contact surfaces remain in substantially mating contact throughout the imposition of transverse shear displacement between the work pieces, without substantial relative transverse displacement between the contact surfaces.

23. A welding method for joining generally axi-symmetric metal parts, said method comprising the steps of:
(a) providing first and second generally axi-symmetric metal work pieces, each work piece having at least one axi-symmetric contact surface adapted for substantially axially-aligned mating engagement with the contact surface of the other work piece;
(b) heating the work pieces so as to raise the temperature in a hot layer of metal adjacent to each contact surface to within the hot working range of the base metal of the work pieces;
(c) bringing the contact surfaces into substantially axially-aligned mating contact while still in the hot working temperature range;
(d) applying axial compressive load across the contact surfaces, said compressive load being sufficient to substantially prevent relative sliding between the contact surfaces in response to the imposition of rotational transverse shear strain sufficient to induce plastic flow in the hot layers adjacent to the contact surfaces of the first and second work pieces; and
(e) imposing rotational transverse shear displacement between the work pieces, said shear displacement being sufficient to induce plastic shear strain within the hot layers to induce bonding of the work pieces in the interfacial region;

such that the contact surfaces remain in substantially mating contact throughout the imposition of transverse shear displacement between the work pieces, without substantial relative transverse displacement between the contact surfaces.

24. Apparatus for use in association with shear-assisted solid state welding of two metal work pieces, each work piece having a contact surface adapted for substantially mating engagement with the contact surface of the other work piece, said apparatus comprising:
  (a) a main body having a first and second end;
  (b) first gripping means associated with the first end of the main body, said first gripping means being adapted for releasably holding a first work piece in fixed relation to the main body; and
  (c) a dual-axis hydraulic actuator at the second end of the main body;
wherein:
  (d) the hydraulic actuator includes an actuator body having a first end and a second end
  (e) the actuator body has a double-acting, hollow bore intermediate forge piston and a double-acting, hollow bore inner rotary piston;
  (f) the intermediate forge piston and the inner rotary piston are concentrically disposed within the actuator body, with the intermediate forge piston acting as a cylinder for the inner rotary piston;
  (g) each of the intermediate forge piston and the inner rotary piston has a first end and a second end corresponding to the ends of the actuator body;
  (h) second gripping means is provided in association with the first end of the intermediate forge piston, said second gripping means being adapted for releasably gripping a second work piece;
  (i) the first end of the actuator body is rigidly attached to the second end of the main body and arranged such that the second gripping means is aligned in opposition to the first gripping means, thus providing means to orient the contact surfaces of the work pieces for mating engagement; and
  (j) the second ends of each of the nested actuator body, the intermediate forge piston, and the inner rotary piston are respectively attached to a similarly nested and close-fitting assembly comprising:
    j.1 an outer sleeve with a plurality of largely axial slots;
    j.2 an intermediate cam profile sleeve with helical slots distributed circumferentially to match with the largely axial slots provided in the outer sleeve; and
    j.3 an inner spider flange carrying outwardly radial shafts provided with cam followers that pass through and independently engage each of the helical and largely axial slots, thereby linking axial motions or the actuator body, the intermediate forge piston, and the inner rotary piston with relative axial movement of the inner rotary piston, causing rotation of the intermediate forge piston largely independent of the intermediate forge piston's axial position relative to the actuator body.

25. The apparatus of claim 24 wherein the direction and pitch of the helical slots in the cam profile sleeve and the axial slots in the outer sleeve are configured to provide the helical and axial slots with generally sinusoidal profiles, whereby the linked motions of the actuator body, the intermediate forge piston, and the inner rotary piston, combined with relative axial movements of the inner rotary piston and the intermediate forge piston, mechanically control the rotation, magnitude, and direction of the intermediate forge piston in coordination with its axial movement.

* * * * *